(12) United States Patent
Min et al.

(10) Patent No.: US 10,402,653 B2
(45) Date of Patent: *Sep. 3, 2019

(54) LARGE MARGIN HIGH-ORDER DEEP LEARNING WITH AUXILIARY TASKS FOR VIDEO-BASED ANOMALY DETECTION

(71) Applicant: NEC Laboratories America, Inc., Princeton, NJ (US)

(72) Inventors: Renqiang Min, Princeton, NJ (US); Dongjin Song, Plainsboro, NJ (US); Eric Cosatto, Red Bank, NJ (US)

(73) Assignee: NEC Corporation (JP)

( * ) Notice: Subject to any disclaimer, the term of this patent is extended or adjusted under 35 U.S.C. 154(b) by 379 days.

This patent is subject to a terminal disclaimer.

(21) Appl. No.: 15/380,014

(22) Filed: Dec. 15, 2016

(65) Prior Publication Data
US 2017/0289409 A1    Oct. 5, 2017

Related U.S. Application Data

(60) Provisional application No. 62/315,091, filed on Mar. 30, 2016.

(51) Int. Cl.
*G06K 9/00* (2006.01)
*H04N 5/21* (2006.01)
(Continued)

(52) U.S. Cl.
CPC ....... *G06K 9/00718* (2013.01); *G06K 9/4628* (2013.01); *G06K 9/6271* (2013.01);
(Continued)

(58) Field of Classification Search
CPC .......... G06N 20/00; G06N 20/10; G06N 3/04; G06N 3/08; G06N 3/084; G06K 9/4628; G06K 9/00718; G06K 2009/00738
See application file for complete search history.

(56) References Cited

U.S. PATENT DOCUMENTS

2016/0272113 A1*   9/2016   Lopez-Hinojosa ..... H04W 4/90

OTHER PUBLICATIONS

Huang, Fu Jie, and Yann LeCun. "Large-scale learning with svm and convolutional for generic object categorization." null. IEEE, 2006. (Year: 2006).*

(Continued)

*Primary Examiner* — Vincent Rudolph
*Assistant Examiner* — Raphael Schwartz
(74) *Attorney, Agent, or Firm* — Joseph Kolodka (57) ABSTRACT

A computer-implemented method and system are provided for video-based anomaly detection. The method includes forming, by a processor, a Deep High-Order Convolutional Neural Network (DHOCNN)-based model having a one-class Support Vector Machine (SVM) as a loss layer of the DHOCNN-based model. An objective of the SVM is configured to perform the video-based anomaly detection. The method further includes generating, by the processor, one or more predictions of an impending anomaly based on the high-order deep learning based model applied to an input image. The method also includes initiating, by the processor, an action to a hardware device to mitigate expected harm to at least one item selected from the group consisting of the hardware device, another hardware device related to the hardware device, and a person related to the hardware device.

17 Claims, 8 Drawing Sheets

(51) Int. Cl.
G06N 3/04 (2006.01)
G06N 3/08 (2006.01)
G06K 9/46 (2006.01)
G06K 9/66 (2006.01)
G06K 9/62 (2006.01)

(52) U.S. Cl.
CPC ............. G06K 9/66 (2013.01); G06N 3/04 (2013.01); G06N 3/0472 (2013.01); G06N 3/08 (2013.01); H04N 5/21 (2013.01); G06K 2009/00738 (2013.01)

(56) References Cited

OTHER PUBLICATIONS

Vlasveld, Roemer, "Introduction to One-class Support Vector Machines", http://rvlasveld.github.io/blog/2013/07/12/introduction-to-one-class-support-vector-machines/, 2013 (Year: 2013).*

Nair, Vinod, and Geoffrey E. Hinton. "Rectified linear units improve restricted boltzmann machines." Proceedings of the 27th international conference on machine learning (ICML-10). 2010. (Year: 2010).*

Liao, Qing, and Qian Zhang. "Efficient rank-one residue approximation method for graph regularized non-negative matrix factorization." Joint European Conference on Machine Learning and Knowledge Discovery in Databases. Springer, Berlin, Heidelberg, 2013. (Year: 2013).*

Adam, et al., "Robust Real-time Unusual Event Detection Using Multiple Fixedlocation Monitors", PAMI, Mar. 2008, pp. 555-560.

Basharat, et al., "Learning Object Motion Patterns for Anomaly Detection and Improved Object Detection", In CVPR, Jun. 2008, 8 pages.

Kim, et al., "Observe Locally, Infer Globally: A Space-time MRF for Detecting Abnormal Activities With Incremental Updates", In CVPR, Jun. 2009, pp. 2921-2928.

Mahadevan, et al., "Anomaly Detection in Crowded Scenes", IEEE Conf. on Computer Vision and Pattern Recognition, Jun. 2010, pp. 1-7.

* cited by examiner

LARGE MARGIN HIGH-ORDER DEEP LEARNING WITH AUXILIARY TASKS FOR VIDEO-BASED ANOMALY DETECTION

RELATED APPLICATION INFORMATION

This application claims priority to U.S. Provisional Pat. App. Ser. No. 62/315,091 filed on Mar. 30, 2016, incorporated herein by reference in its entirety. Moreover, this application is related to commonly assigned application Ser. No. 15/380,308, filed concurrently herewith and incorporated herein by reference.

BACKGROUND

Technical Field

The present invention relates to data processing and more particularly to large margin high-order deep learning with auxiliary tasks for video-based anomaly detection.

Description of the Related Art

Recently, there has been increasing interest within computer vision in analyzing anomalous events based on image collections or video sequences. Such analysis has been directed to tasks such as, for example, product inspection for defects in factories, autonomous driving, public safety video surveillance, and so forth.

One approach developed to perform these tasks is based on trajectory modeling. In trajectory modeling, the main idea is to track each object in the video sequences and learn models for the object tracks. These tasks, however, are difficult for video sequences which include dense objects. Another approach is based upon motion representations such as dense optical flow, or spatio-temporal gradients.

These existing approaches focus on modeling motion information while ignoring the high-order feature interaction representation within each static image and may not perform well for supervised learning since only limited number of positive examples/labels are available. High-order feature interactions naturally exist in many real-world data, including images, video sequences, financial time series, biomedical informatics data, and so forth. These interplays often convey essential information about the latent structures of the data. For anomaly detection, therefore, it is crucial to consider these high-order characteristic features while making the decision.

SUMMARY

According to an aspect of the present invention, a computer-implemented method is provided for video-based anomaly detection. The method includes forming, by a processor, a Deep High-Order Convolutional Neural Network (DHOCNN)-based model having a one-class Support Vector Machine (SVM) as a loss layer of the DHOCNN-based model. An objective of the SVM is configured to perform the video-based anomaly detection. The method further includes generating, by the processor, one or more predictions of an impending anomaly based on the high-order deep learning based model applied to an input image. The method also includes initiating, by the processor, an action to a hardware device to mitigate expected harm to at least one item selected from the group consisting of the hardware device, another hardware device related to the hardware device, and a person related to the hardware device.

According to another aspect of the present invention, a computer program product is provided for video-based anomaly detection. The computer program product includes a non-transitory computer readable storage medium having program instructions embodied therewith. The program instructions are executable by a computer to cause the computer to perform a method. The method includes forming, by a processor, a Deep High-Order Convolutional Neural Network (DHOCNN)-based model having a one-class Support Vector Machine (SVM) as a loss layer of the DHOCNN-based model. An objective of the SVM is configured to perform the video-based anomaly detection. The method further includes generating, by the processor, one or more predictions of an impending anomaly based on the high-order deep learning based model applied to an input image. The method also includes initiating, by the processor, an action to a hardware device to mitigate expected harm to at least one item selected from the group consisting of the hardware device, another hardware device related to the hardware device, and a person related to the hardware device.

According to yet another aspect of the present invention, a computer processing system is provided for performing video-based anomaly detection. The computer processing system includes a processor. The processor is configured to form a Deep High-Order Convolutional Neural Network (DHOCNN)-based model having a one-class Support Vector Machine (SVM) as a loss layer of the DHOCNN-based model. An objective of the SVM is configured to perform the video-based anomaly detection. The processor is further configured to generate one or more predictions of an impending anomaly based on the high-order deep learning based model applied to an input image. The processor is further configured to initiate an action to a hardware device to mitigate expected harm to at least one item selected from the group consisting of the hardware device, another hardware device related to the hardware device, and a person related to the hardware device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to large margin high-order deep learning with auxiliary tasks for video-based anomaly detection.

In an embodiment, the present invention conducts supervised anomaly detection with Deep High-Order Convolutional Neural Networks (DHOCNN). One difficulty for supervised anomaly detection, however, is that we often lack sufficient labeled positive examples to train model parameters. To address this issue, the present invention first pre-trains the proposed DHOCNN with auxiliary tasks. Then, the model parameters are fine-tuned with the ground truth.

In an embodiment, the DHOCNN performs anomaly detection in video sequences. The contributions/advantages provided by the present invention are from three folds. First, different from a CNN which utilizes linear kernels with linear filters applied to raw pixels of image patches of video sequences to compute feature maps, a DHOCNN uses many high-order kernels with explicit parametric high-order feature interactions to convolute with each image patch for generating many planes of convolutional feature maps (i.e., in a high-order convolution layer). Then, the DHOCNN is pre-trained based upon auxiliary tasks. Finally, the objective of one-class Support Vector Machine (SVM) is adopted as the loss layer and back-propagation is employed to fine tune the model parameters. Hence, instead of using sigmoid loss or squared loss as the last layer, DHOCNN utilizes the objective of one-class support vector machine (SVM) which is specially designed for anomaly detection as the last layer.

After the high-order convolution layer, DHOCNN makes use of rectified linear units, a max pooling layer, and a fully connected layer, in order to extract effective feature representations for each image from an input video sequence.

Figure 1:
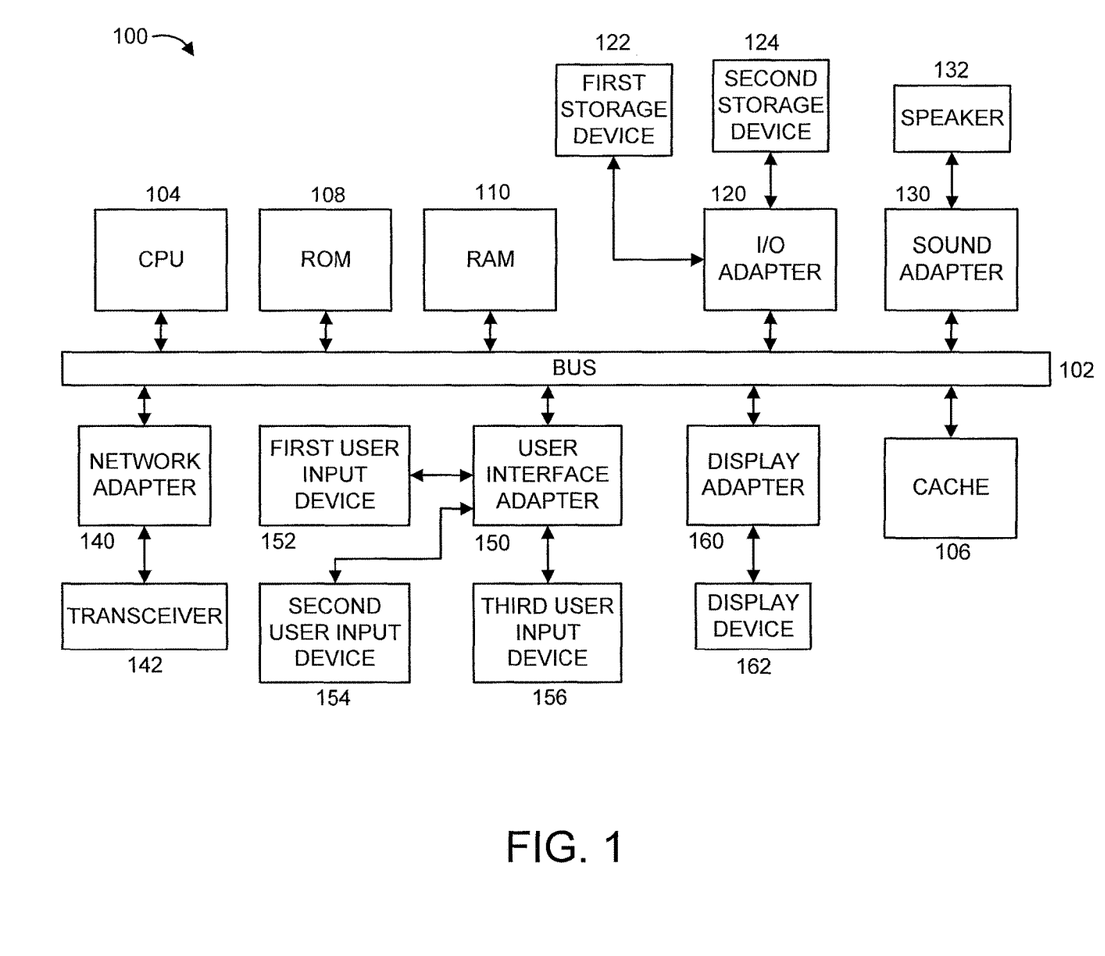
FIG. 1 shows a block diagram of an exemplary processing system to which the invention principles may be applied, in accordance with an embodiment of the present invention.

FIG. 1 shows a block diagram of an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. The speaker 132 can be used to provide an audible alarm or some other indication relating to resilient battery charging in accordance with the present invention. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
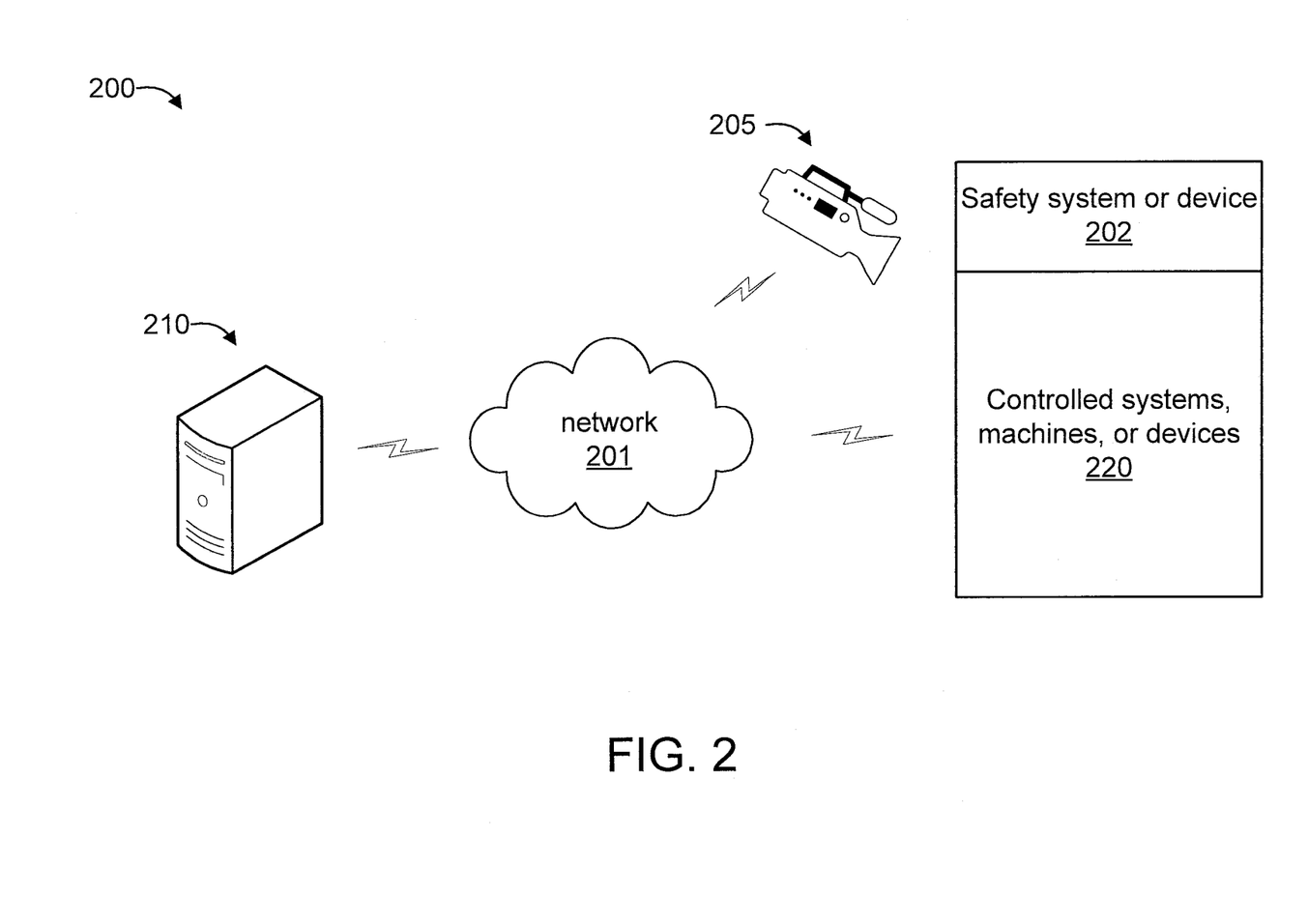
FIG. 2 shows a block diagram of an exemplary environment 200 to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 7:
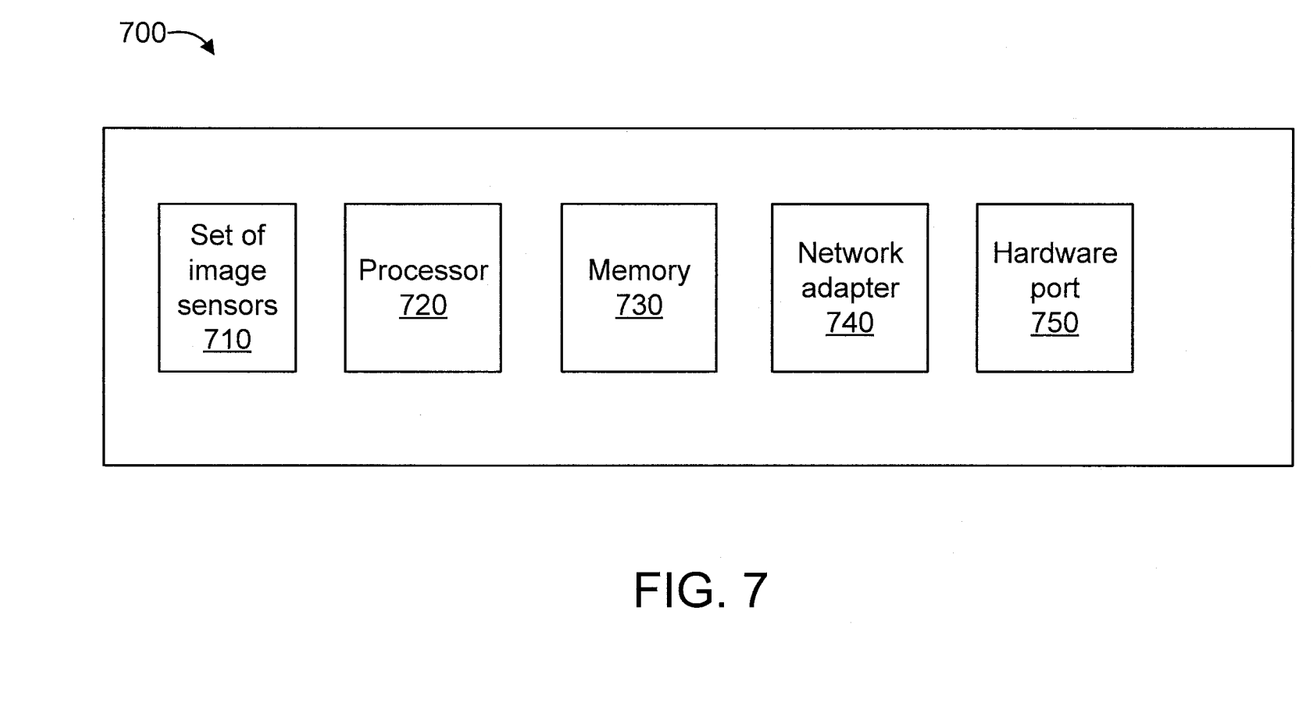
FIG. 7 shows a block diagram of an exemplary video camera 700, in accordance with an embodiment of the present invention.

Also, it is to be appreciated that system 700 described below with respect to FIG. 7 is a system for implementing respective embodiments of the present invention. Part or all of processing system 100 may be implemented in one or more of the elements of system 700.

Figure 3:
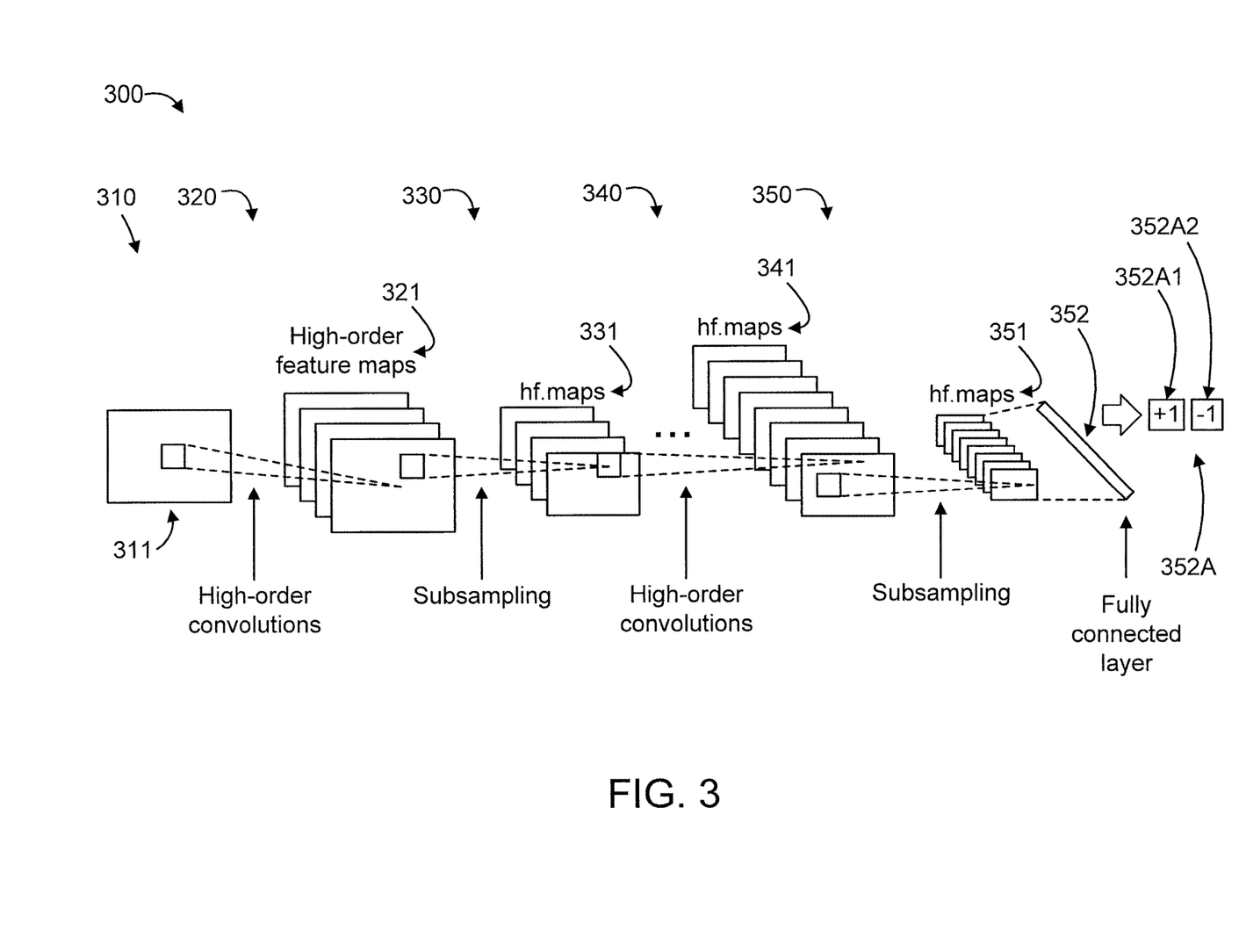
FIG. 3 shows a high-level block/flow diagram of an exemplary DHOCNN/DHOCNN method 300, in accordance with an embodiment of the present invention.
Figure 4:
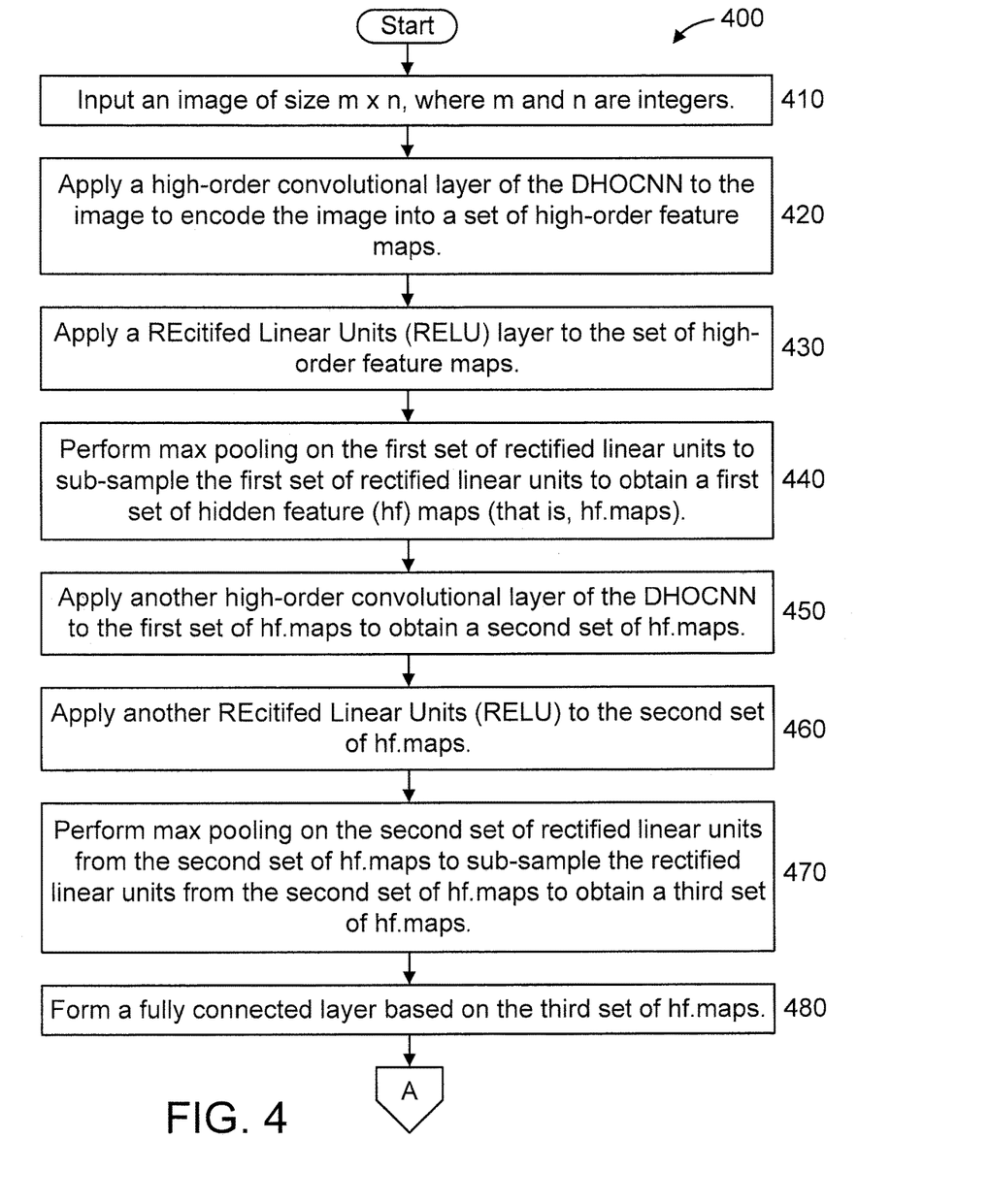
FIGS. 4-5 show a flow diagram of an exemplary method 400 for forming a DHOCNN, in accordance with an embodiment of the present invention.
Figure 5:
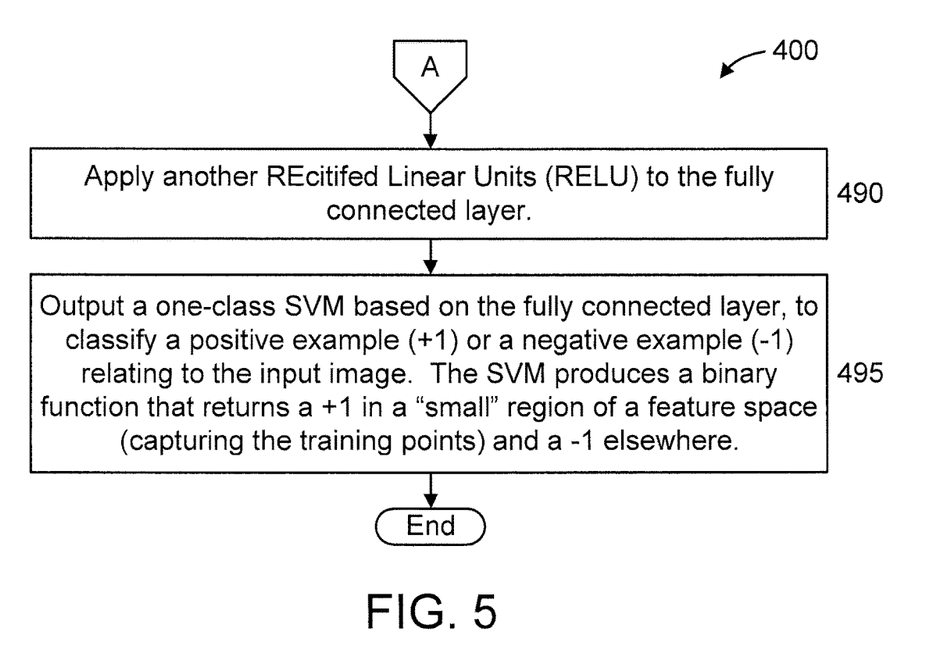
Figure 6:
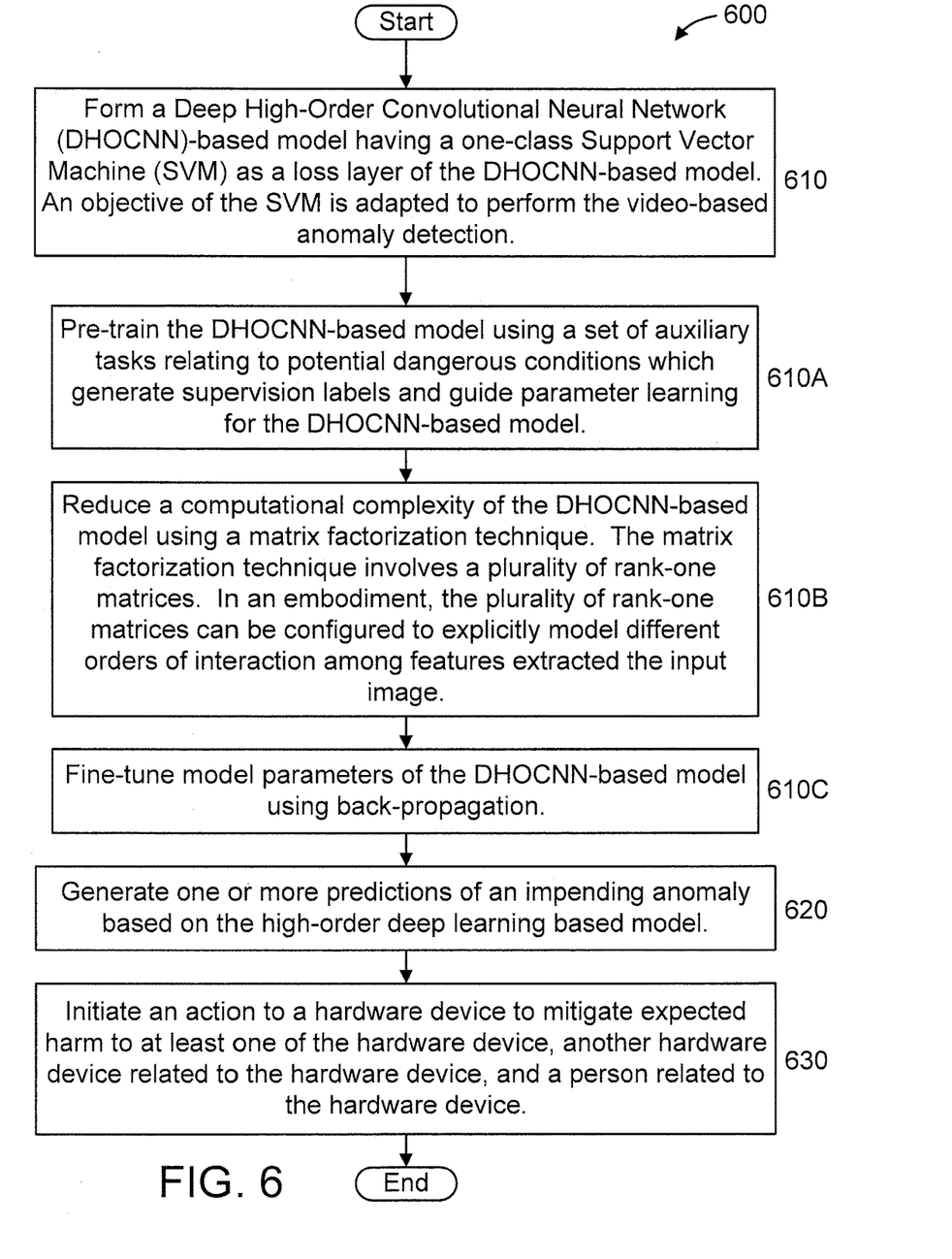
FIG. 6 shows a flow diagram of an exemplary method 600 for using a DHOCNN-based model, in accordance with an embodiment of the present invention.
Figure 8:
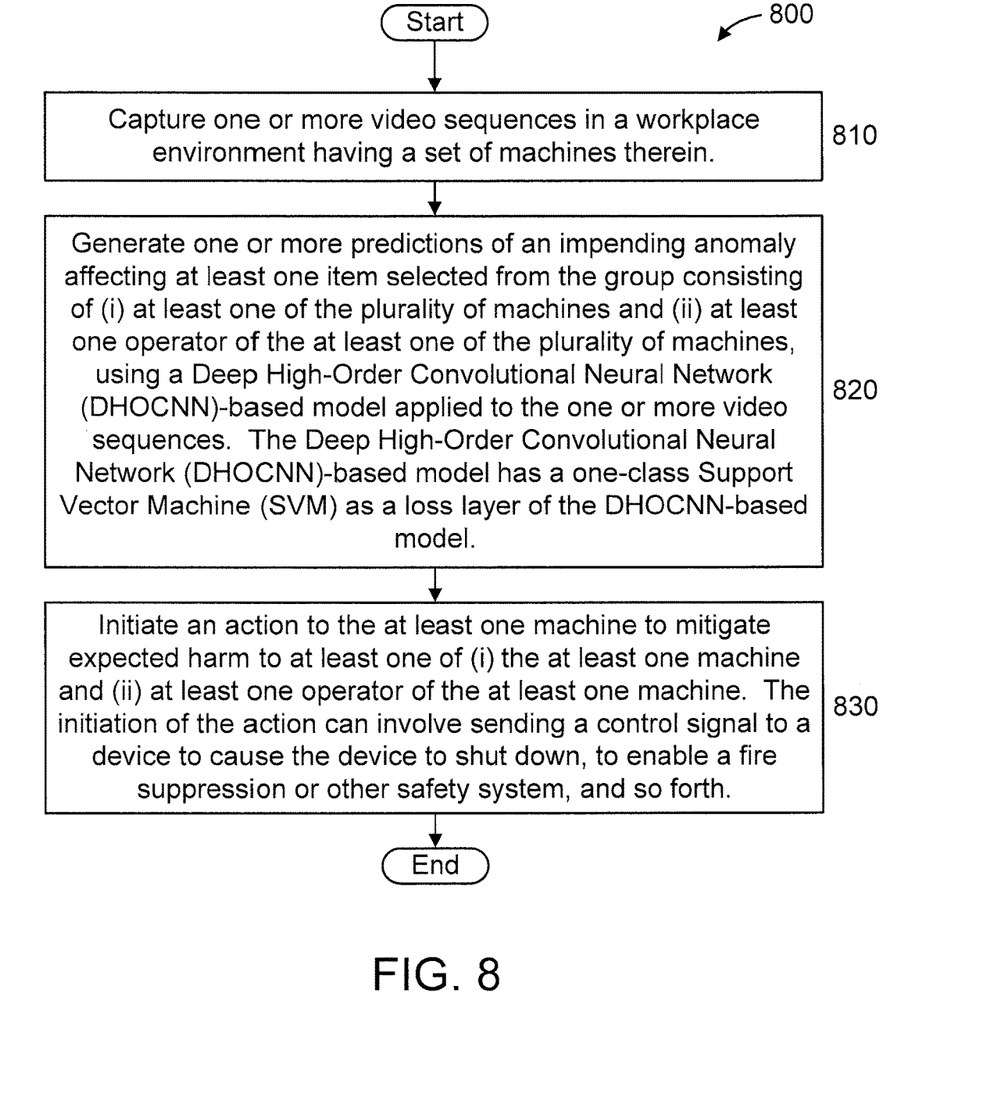
FIG. 8 shows a flow diagram of another exemplary method 800 for using a DHOCNN-based model, in accordance with an embodiment of the present invention.

Further, it is to be appreciated that processing system 100 may perform at least part of the method described herein including, for example, at least part of method 300 of FIG. 3 and/or at least part of method 400 of FIGS. 4-5 and/or at least part of method 600 of FIG. 6 and/or at least part of method 800 of FIG. 8. Similarly, part or all of environment 200 may be used to perform at least part of method 300 of FIG. 3 and/or at least part of method 400 of FIGS. 4-5 and/or at least part of method 600 of FIG. 6 and/or at least part of method 800 of FIG. 8. Also similarly, part or all of system 700 may be used to perform at least part of method 300 of FIG. 3 and/or at least part of method 400 of FIGS. 4-5 and/or at least part of method 600 of FIG. 6 and/or at least part of method 800 of FIG. 8.

FIG. 2 shows a block diagram of an exemplary environment 200 to which the present invention can be applied, in accordance with an embodiment of the present invention. The environment 200 is representative of a computer network to which the present invention can be applied. The elements shown relative to FIG. 2 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 200 at least includes at least one safety system or device 202, at least one video camera 205, at least one computer processing system 210, at least one controlled system(s), machine(s), and/or device(s) (individually and collectively denoted by the reference numeral 220 and hereinafter referred to as "controlled system, machine, and/or device"). For the sake of simplicity and illustration, the preceding elements are shown in singular form, but can be readily extended to more than one of any of the preceding elements as readily appreciated by one of ordinary skill in the art given the teachings of the present invention provided herein, while maintaining the spirit of the present invention. The computer processing system 210 can be any type of computer processing system including, but not limited to, servers, desktops, laptops, tablets, smart phones, media playback devices, and so forth, depending upon the particular implementation. For the sake of illustration, the computer processing system 210 is a server.

The at least one video camera 205 is configured to capture one or more video sequences that are processed by the computer processing system 210.

The computer processing system 210 is configured to perform large-margin high-order deep learning with auxiliary tasks for video-based anomaly detection. Moreover, the computer processing system 210 is configured to perform an action (e.g., a control action) on the controlled system, machine, and/or device 220 responsive to detecting an anomaly. Such action can include, but is not limited to, one or more of: powering down the controlled system, machine, and/or device 220 or a portion thereof; powering down, e.g., a system, machine, and/or a device that is affected by an anomaly in another device, opening a valve to relieve excessive pressure (depending upon the anomaly), locking an automatic fire door, and so forth. As is evident to one of ordinary skill in the art, the action taken is dependent upon the type of anomaly and the controlled system, machine, and/or device 220 to which the action is applied.

The safety system or device 202 can implement the aforementioned or other action. The safety system or device 202 can be a shut off switch, a fire suppression system, an overpressure valve, and so forth. As is readily appreciated by one of ordinary skill in the art, the particular safety system or device 202 used depends upon the particular implementation to which the present invention is applied. Hence, the safety system 202 can be located within or proximate to or remote from the controlled system, machine, and/or device 220, depending upon the particular implementation.

In the embodiment shown in FIG. 2, the elements thereof are interconnected by a network(s) 201. However, in other embodiments, other types of connections (e.g., wired, etc.) can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 3 shows a high-level block/flow diagram of an exemplary DHOCNN/DHOCNN method 300, in accordance with an embodiment of the present invention.

At step 310, receive an input image 311.

At step 320, perform high-order convolutions on the input image 311 to obtain high-order feature maps 321.

At step 330, perform sub-sampling on the high-order feature maps 321 to obtain a set of hf.maps 331.

At step 340, perform high-order convolutions on the set of hf.maps 331 to obtain another set of hf.maps 341.

At step 350, perform sub-sampling on the other set of hf.maps 341 to obtain yet another set of hf.maps 351 that form a fully connected layer 352. The fully connected layer 352 provides an output 352A that includes a positive example 352A1 or a negative example 352A2.

It is to be appreciated that the neurons in the fully connected layer 352 have full connections to all activations in the previous layer. Their activations can hence be computed with a matrix multiplication followed by a bias offset.

We can optionally have more fully connected layers rather than just 352 and more repeated steps of 320 and 330 rather than just 340 and 350 depending on different tasks It is to be further appreciated that while a single image is mentioned with respect to step 310, multiple images such as in the case of one or more video sequences can be input and processed in accordance with the method 300 of FIG. 3, while maintaining the spirit of the present invention.

FIGS. 4-5 show a flow diagram of an exemplary method 400 for forming a DHOCNN, in accordance with an embodiment of the present invention. Method 400 corresponds to DHOCNN/DHOCNN method 300 of FIG. 3 and further describes the operations performed to form a DHOCNN-based model in accordance with an embodiment of the present invention.

At step 410, input an image of size m×n, where m and n are integers.

At step 420, apply a high-order convolutional layer of the DHOCNN to the image to encode the image into a set of high-order feature maps.

At step 430, apply a REcitifed Linear Units (RELU) layer to the set of high-order feature maps. The rectified linear units layer applies an activation function to the set of high-order feature maps to define an output of each node of the DHOCNN given an input or set of inputs (here, portions of the set of high-order feature maps).

At step 440, perform max pooling on the first set of rectified linear units to sub-sample the first set of rectified linear units to obtain a first set of hidden feature (hf) maps (that is, hf.maps). Max pooling is a form of non-linear down-sampling that partitions the input image into a set of non-overlapping rectangles and, for each such sub-region, outputs the maximum value.

At step 450, apply another high-order convolutional layer of the DHOCNN to the first set of hf.maps to obtain a second set of hf.maps.

At step 460, apply another REcitifed Linear Units (RELU) to the second set of hf.maps.

At step 470, perform max pooling on the second set of rectified linear units from the second set of hf.maps to sub-sample the rectified linear units from the second set of hf.maps to obtain a third set of hf.maps.

At step 480, form a fully connected layer based on the third set of hf.maps.

At step 490, apply another REcitifed Linear Units (RELU) to the fully connected layer.

The combined sequential steps of 420-430-440 and 480-490 can be respectively repeated multiple times to be consistent with FIG. 3 depending on specific problem settings.

At step 495, output a one-class SVM based on the fully connected layer, to classify a positive example (+1) or a negative example (−1) relating to the input image. The SVM produces a binary function that returns a +1 in a "small" region of a feature space (capturing the training points) and a −1 elsewhere.

It is to be appreciated that while max pooling is described with respect to FIG. 4, other types of pooling can also be used, while maintaining the spirit of the present invention.

It is to be further appreciated that each of the convolutional layers comprises a set of many learnable filters (also referred to as "kernels") which have a small receptive field. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

FIG. 6 shows a flow diagram of an exemplary method 600 for using a DHOCNN-based model, in accordance with an embodiment of the present invention. The DHOCNN-based model can be formed from any of method 300 and method 400.

At step 610, form a Deep High-Order Convolutional Neural Network (DHOCNN)-based model having a one-class Support Vector Machine (SVM) as a loss layer of the DHOCNN-based model. An objective of the SVM is adapted to perform the video-based anomaly detection.

In an embodiment, step 610, includes steps 610A, 610B, and 610C.

At step 610A, pre-train the DHOCNN-based model using a set of auxiliary tasks relating to potential dangerous conditions which generate supervision labels and guide parameter learning for the DHOCNN-based model.

At step 610B, reduce a computational complexity of the DHOCNN-based model using a matrix factorization technique. The matrix factorization technique involves a plurality of rank-one matrices. In an embodiment, the plurality of rank-one matrices can be configured to explicitly model different orders of interaction among features extracted the input image.

At step 610C, fine-tune model parameters of the DHOCNN-based model using back-propagation.

At step 620, generate one or more predictions of an impending anomaly based on the high-order deep learning based model.

At step 630, initiate an action to a hardware device to mitigate expected harm to at least one of the hardware device, another hardware device related to the hardware device, and a person related to the hardware device. For example, in a scenario where an output of the (initial) hardware device is provided as an input to the other (subsequent, that is, following) hardware device (e.g., in an assembly line, a factory, a network, etc.), an anomaly in the initial hardware device can propogate the anomaly or a result of the anomaly to the subsequent hardware device. In such cases, either or both can be physically powered down or some other mitigating action can be taken. Moreover, in a scenario, where an anomaly in the hardware device can cause physical harm to a person related to the device (e.g., an operator of the device, a person proximate to the device, and so forth) absent some (immediate) action taken on the device, an acton can be performed, for example, but not limited to, powering down the device, enabling a safety feature (e.g., fire suppression, etc.) of the device, and so forth. These and various other scenarios and applications to which the present invention can be applied as readily determined by one of ordinary skill given the teachings of the present invention provided herein, while maintaining the spirit of the present invention.

FIG. 7 shows a block diagram of an exemplary video camera 700, in accordance with an embodiment of the present invention. The video camera 700 includes a set of image sensors 710, a processor 720, a memory 730, a network adapter 740, and a hardware port 750.

The image sensors 710 capture video sequences processed by the processor 720 and the memory 730.

The processor 720 and memory 730 can initiate an action based on an anomaly detection result using a DHOCNN as described herein.

The network adapter 740 sends a signal that causes the action to occur. Exemplary actions are described herein that can be taken depending upon the anomaly detection result.

The hardware port 750 receives a wired communication medium over which the signal can be transmitted.

FIG. 8 shows a flow diagram of another exemplary method 800 for using a DHOCNN-based model, in accordance with an embodiment of the present invention. The DHOCNN-based model can be formed from any of method 300 and method 400. The method 800 can be readily applied to workplace scenarios such as factories, assembly lines, manufacturing plants, distribution plants, and so forth. In an embodiment, method 800 is performed by a video camera adapted to perform video-based anomaly detection (such as video camera 700).

At step 810, capture one or more video sequences in a workplace environment having a set of machines therein.

At step 820, generate one or more predictions of an impending anomaly affecting at least one item selected from the group consisting of (i) at least one of the plurality of machines and (ii) at least one operator of the at least one of the plurality of machines, using a Deep High-Order Convolutional Neural Network (DHOCNN)-based model applied to the one or more video sequences. The Deep High-Order Convolutional Neural Network (DHOCNN)-based model has a one-class Support Vector Machine (SVM) as a loss layer of the DHOCNN-based model.

At step 830, initiate an action to the at least one machine to mitigate expected harm to at least one of (i) the at least one machine and (ii) at least one operator of the at least one machine. The initiation of the action can involve sending a control signal to a device to cause the device to shut down, to enable a fire suppression or other safety system, and so forth.

A further description will now be given of the DHOCNN 300 of FIG. 3 regarding a high-order convolutional layer, in accordance with an embodiment of the present invention.

As shown in FIG. 3, the DHOCNN 300 uses the images of a video sequence as an input and encode the images with a high-order convolutional layer. Assuming X is an input image of size m×n, we use $P_{ij}(X)$ to denote the patch of size k×k (k<min(m,n)) around the pixel in i-th column and j-th row of X, W to denote a filter of size k×k, x to denote the vectorized $P_{ij}(X)$ with $k^2$ dimension, and w to denote the vectorized W with $k^2$ dimension. Traditional CNN utilize the inner product of w and x, i.e., $w^T x$ to represent the value in the i-th column and j-th row of the convoluted feature map. Instead of utilizing $w^T x$ to produce the feature map, DHOCNN can capture the second order interaction of pixels with $x^T S_q x$, where $S_q \in R^{k^2 \times k^2}$ is the q-th high-order filter for producing the q-th high-order feature maps.

In order to reduce the computational complexity of the model, a matrix factorization technique is deployed.

In an embodiment, the computation of $S_m$ can be approximated by rank-one matrices $T_{qt} \in R^{1 \times k^2}$ with ($h < k^2$) with $S_q \approx \Sigma_{l=1}^r t_{ql} T_{ql}^T T_{ql}$ where $t_{ml}$ is the weight associated with the l-th rank-1 interaction matrix. We note that the low rank approximation not only reduces computational complexity significantly, but also is amenable to explicitly model different orders of interaction in the data. That is, for higher-order interaction O, we have $\Sigma_{l=1}^r t_{ql} (x^T T_{ql}^T)^o$.

A description will now be given of a one-class Support Vector Machine (SVM), in accordance with an embodiment of the present invention.

The main idea of one-class SVM is to separate all the data examples from the origin (in feature space) and maximizes the distance from its hyperplane to the origin. The one-class SVM produces a binary function which captures regions in the input space where the probability density of the data examples is greatest. Thus the function returns +1 in a "small" region (capturing the training data points) and −1 elsewhere. Thus, the one-class SVM is used to perform anomaly detection. In particular, the objective of one-class SVM is given as follows:

$$\min_{w,\{\xi_i\},\rho} \frac{1}{2}\|w\|^2 + \frac{1}{vn}\sum_{i=1}^n \xi_i - \rho$$

subject to: $(w \cdot \phi(f(x_i))) \geq \rho - \xi_i$ for all $i = 1, \ldots, n$ $\xi_i \geq 0$ for all $i = 1, \ldots, n$ where $f(x_i)$ is the feature representation output by the last fully connected layer of HOCNN for input image $x_i$. $\Phi(.)$ represents an additional optional feature transformation. In practice, we can ignore $\Phi(.)$ and directly use $f(x_i)$ as the input feature to one-class SVM.

Since often there are at most a few abnormal cases but abundant normal cases, a one-class SVM is trained in the final feature space generated by the DHOCNN to fit the normal cases well.

A description will now be given of an optimization, in accordance with an embodiment of the present invention.

To optimize DHOCNN, the DHOCNN is first pre-trained with auxiliary tasks based upon back-propagation in standard supervised learning settings. Then, the model parameters are fine-tuned with the ground truth based upon back-propagation by optimizing the loss of one-class SVM.

A description will now be given regarding specific competitive/commercial advantages of the solution achieved by the present invention.

The DHOCNN of the present invention can be used to detect anomaly cases for product inspection, public safety surveillance, fighting scene (or any type of scene) recognition, and fire or other disaster detection based on camera images and/or other sensor data.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for video-based anomaly detection, comprising:
    forming, by a processor, a Deep High-Order Convolutional Neural Network (DHOCNN)-based model having a one-class Support Vector Machine (SVM) as a loss layer of the DHOCNN-based model, an objective of the SVM being configured to perform the video-based anomaly detection;
    generating, by the processor, one or more predictions of an impending anomaly based on the high-order deep learning based model applied to an input image; and
    initiating, by the processor, an action to a hardware device to mitigate expected harm to at least one item selected from the group consisting of the hardware device, another hardware device related to the hardware device, and a person related to the hardware device;
    wherein the DHOCNN-based model uses a plurality of high-order kernels to capture high-order feature interactions relating to the input image on which the video-based anomaly detection is performed.

2. The computer-implemented method of claim 1, further comprising pre-training the DHOCNN-based model using a plurality of auxiliary tasks relating to potential dangerous conditions which generate supervision labels and guide parameter learning for the DHOCNN-based model.

3. The computer-implemented method of claim 2, wherein pre-training the DHOCNN-based model uses back-propagation with the plurality of auxiliary tasks.

4. The computer-implemented method of claim 1, further comprising fine-tuning model parameters of the DHOCNN-based model using back-propagation.

5. The computer-implemented method of claim 1, wherein the SVM is employed in a final layer of the DHOCNN-based model.

6. The computer-implemented method of claim 1, wherein the video-based anomaly detection is supervised video-based anomaly detection.

7. The computer-implemented method of claim 1, further comprising reducing a computational complexity of the DHOCNN-based model using a matrix factorization technique.

8. The computer-implemented method of claim 7, wherein the matrix factorization technique involves a plurality of rank-one matrices.

9. The computer-implemented method of claim 1, wherein the SVM is configured to separate data examples from an origin in a feature space and maximize a distance from a hyperplane of the feature space to the origin.

10. The computer-implemented method of claim 1, wherein the SVM is configured to produce a binary function that captures regions in a feature space where a probability density is greatest.

11. A computer-implemented method for video-based anomaly detection, comprising:
    forming, by a processor, a Deep High-Order Convolutional Neural Network (DHOCNN)-based model having a one-class Support Vector Machine (SVM) as a loss layer of the DHOCNN-based model, an objective of the SVM being configured to perform the video-based anomaly detection;
    generating, by the processor, one or more predictions of an impending anomaly based on the high-order deep learning based model applied to an input image; and
    initiating, by the processor, an action to a hardware device to mitigate expected harm to at least one item selected from the group consisting of the hardware device, another hardware device related to the hardware device, and a person related to the hardware device;
    further comprising reducing a computational complexity of the DHOCNN-based model using a matrix factorization technique;
    wherein the matrix factorization technique involves a plurality of rank-one matrices;
    wherein the plurality of rank-one matrices are configured to explicitly model different orders of interaction among features extracted the input image.

12. A computer program product for video-based anomaly detection, the computer program product comprising a non-transitory computer readable storage medium having program instructions embodied therewith, the program instructions executable by a computer to cause the computer to perform a method comprising:
    forming, by a processor, a Deep High-Order Convolutional Neural Network (DHOCNN)-based model having a one-class Support Vector Machine (SVM) as a loss layer of the DHOCNN-based model, an objective of the SVM being configured to perform the video-based anomaly detection;
    generating, by the processor, one or more predictions of an impending anomaly based on the high-order deep learning based model applied to an input image; and
    initiating, by the processor, an action to a hardware device to mitigate expected harm to at least one item selected from the group consisting of the hardware device, another hardware device related to the hardware device, and a person related to the hardware device;
    wherein the method further comprises reducing a computational complexity of the DHOCNN-based model using a matrix factorization technique that involves a plurality of rank-one matrices, and wherein the plurality of rank-one matrices are configured to explicitly model different orders of interaction among features extracted the input image.

13. The computer program product of claim 12, wherein the method further comprises pre-training the DHOCNN-based model using a plurality of auxiliary tasks relating to potential dangerous conditions which generate supervision labels and guide parameter learning for the DHOCNN-based model.

14. The computer program product of claim 12, wherein the method further comprises fine-tuning model parameters of the DHOCNN-based model using back-propagation.

15. The computer program product of claim 12, wherein the SVM is employed in a final layer of the DHOCNN-based model.

16. The computer program product of claim 12, wherein the SVM is configured to separate data examples from an origin in a feature space and maximize a distance from a hyperplane of the feature space to the origin.

17. The computer program product of claim 12, wherein the SVM is configured to produce a binary function that captures regions in a feature space where a probability density is greatest.

* * * * *